US012601843B2

(12) United States Patent
Seibert et al.

(10) Patent No.: US 12,601,843 B2
(45) Date of Patent: Apr. 14, 2026

(54) DEVICE, A SYSTEM, A METHOD AND COMPUTER PROGRAM PRODUCT FOR IDENTIFYING INTERFERING DEVICES IN POSITION MEASUREMENTS

(71) Applicant: FNV IP B.V., Leidschendam (NL)

(72) Inventors: Joachim Ulrich Seibert, Rijswijk (NL); Michal Pasternak, Leidschendam (NL)

(73) Assignee: FNV IP B.V., Leidschendam (NL)

( * ) Notice: Subject to any disclaimer, the term of this patent is extended or adjusted under 35 U.S.C. 154(b) by 625 days.

(21) Appl. No.: 17/623,340

(22) PCT Filed: Jun. 30, 2020

(86) PCT No.: PCT/NL2020/050430
§ 371 (c)(1),
(2) Date: Dec. 28, 2021

(87) PCT Pub. No.: WO2021/002746
PCT Pub. Date: Jan. 7, 2021

(65) Prior Publication Data
US 2022/0357459 A1     Nov. 10, 2022

(30) Foreign Application Priority Data

Jul. 1, 2019    (NL) ...................................... 2023416

(51) Int. Cl.
*G01S 19/21*          (2010.01)
(52) U.S. Cl.
CPC .................................. *G01S 19/215* (2013.01)
(58) Field of Classification Search
CPC .......................... G01S 19/21–215; H04K 3/90
See application file for complete search history.

(56) References Cited

U.S. PATENT DOCUMENTS

2010/0045506 A1* 2/2010 Law ......................... G01S 19/21
                                                               342/13
2011/0287779 A1* 11/2011 Harper ................... H04W 4/025
                                                               342/357.31

(Continued)

FOREIGN PATENT DOCUMENTS

EP          2550543 B1     2/2018

OTHER PUBLICATIONS

Jansen et al.: "Crowd-GPS-Sec: Leveraging Crowdsourcing to Detect and Localize GPS Spoofing Attacks", 2018 IEEE Symposium on Security and Privacy, May 20, 2018, pp. 1018-1031.

(Continued)

*Primary Examiner* — Cassi J Galt
(74) *Attorney, Agent, or Firm* — Polsinelli PC

(57)          ABSTRACT

A interference detection device performing the following actions:
receiving individual position data from mobile terminals which individual position data indicates an area in which individual ones of the mobile terminals are located based on positioning signals received by the mobile terminals; identifying if individual position data may have been affected by one or more interfering signals transmitted by interfering device and interfering with the positioning signals;
(A) identifying if a number of mobile terminals in a first area is higher than a maximum threshold number, and, if so, determining that individual position data of the number of mobile terminals may have been affected by the interfering signals; or
(B) identifying if a number of the mobile terminals in a second area is lower than a minimum threshold number; and, if so, determining that individual position data of the number of mobile terminals may have been affected by interfering signals; or (Continued)

(C) receiving further individual position data which indicates further areas in which mobile terminals are located based on another positioning technique than a positioning technique used to determine the individual position data as received from the mobile terminals; determining if the areas overlap with the further areas at least to a minimum extent, and, if not, determining that individual position data of the mobile terminals may have been affected by the interfering signals.

19 Claims, 9 Drawing Sheets

(56) References Cited

U.S. PATENT DOCUMENTS

2016/0154112 A1* 6/2016 Nichols .................. G01S 19/10
                                                  342/357.47
2016/0154113 A1* 6/2016 Leibner .................. G01S 19/21
                                                  342/357.59
2016/0349373 A1* 12/2016 Ben-Moshe ........... G01S 19/21
2017/0070971 A1    3/2017 Wietfeldt et al.
2017/0365171 A1* 12/2017 Haran ............... G08G 1/09675
2019/0041223 A1*  2/2019 Yang ..................... G01C 21/30

OTHER PUBLICATIONS

Bardout: Authentication of GNSS Position: An Assessment of Spoofing Detection Methods, GNSS 2011—Proceedings of the 24th International Technical Meeting of the Satellite Division of the Institute of Navigation (ION GNSS 2011), Sep. 23, 2011, pp. 436-446.

Lundberg et al.: Novel Timing Antennas for Improved GNSS Resilience, The Homeland Security Systems Engineering and Development Institute (HSSEDI), The MITRE Corporation, 2018.

* cited by examiner

DEVICE, A SYSTEM, A METHOD AND COMPUTER PROGRAM PRODUCT FOR IDENTIFYING INTERFERING DEVICES IN POSITION MEASUREMENTS

FIELD OF THE INVENTION

The present invention relates to a device, a system and method of identifying interfering devices in position measurements

BACKGROUND ART

The present invention discusses devices, systems and methods capable of identifying interfering devices in position measurements. Such interfering devices are also known as spoofing or jamming devices.

In general, in the context of information security, and especially network security, a spoofing attack is a situation in which a person or program successfully masquerades as another by falsifying data, to gain an illegitimate advantage. E.g., many of the protocols in the TCP/IP suite do not provide mechanisms for authenticating the source or destination of a message, and are thus vulnerable to spoofing attacks when extra precautions are not taken by applications to verify the identity of the sending or receiving host.

A GNSS (Global Navigation Satellite System) spoofing attack attempts to deceive a GNSS receiver by broadcasting incorrect GNSS signals, structured to resemble a set of normal GNSS signals, or by rebroadcasting genuine signals captured elsewhere or at a different time. These spoofed signals may be modified in such a way as to cause a receiver to estimate its position to be somewhere other than where it actually is, or to be located where it is but at a different time, as determined by the attacker. One common form of a GNSS spoofing attack, commonly termed a carry-off attack, begins by broadcasting signals synchronized with the genuine signals observed by the target receiver. The power of the counterfeit signals is then gradually increased and drawn away from the genuine signals.

Since the advent of Software Defined Radio, GNSS simulator applications have been made available to the general public. This has made GNSS spoofing much more accessible, meaning it can be performed at limited expense and with a modicum of technical knowledge.

There are different ways to prevent GNSS spoofing. Some of them are (cf.: en.wikipedia.org/wiki/Spoofing_attack, Jun. 17, 2019):

1. Obscure antennas. Install antennas where they are not visible from publicly accessible locations or obscure their exact locations by introducing impediments to hide the antennas.
2. Add a sensor/blocker. Sensors can detect characteristics of interference, jamming, and spoofing signals, provide local indication of an attack or anomalous condition, communicate alerts to a remote monitoring site, and collect and report data to be analyzed for forensic purposes. Cf. E. Lundberg et al, Novel Timing Antennas for Improved GNSS Resilience, The Homeland Security Systems Engineering and Development Institute (HSSEDI)™ Operated by The MITRE Corporation on behalf of the Department of Homeland Security, Case Number 18-0336/DHS reference number 17-J-00100-03, 2018.
3. Extend data spoofing whitelists to sensors. Existing data spoofing whitelists have been and are being implemented in government reference software, and should also be implemented in sensors.
4. Use more GNSS signal types. Modernized civil GNSS signals are more robust than the L1 signal and should be leveraged for increased resistance to interference, jamming, and spoofing.
5. Reduce latency in recognition and reporting of interference, jamming, and spoofing. If a receiver is misled by an attack before the attack is recognized and reported, then backup devices may be corrupted by the receiver before hand over.

US20170070971 discloses systems, methods and techniques for determining or inferring a status or fault for a portion or aspect of a global navigation satellite system (GNSS). Fault messages may be received from multiple mobile devices where fault messages provide indicators indicative of events or conditions. Fault indicators in received fault messages obtained from messages received from two or more of the mobile devices may be combined to infer a status or fault of at least a portion of a GNSS. Augmentation parameters conveying information related to an inferred fault may be transferred to a mobile device to improve GNSS location of the mobile device.

Spoofing condition or event affecting services from a first GNSS based on one or more observations of satellite positioning system signals transmitted by a second GNSS may be detected.

Reporting mobile devices may correlate the status indicators in which fault indicators are obtained from them with one or more fault indicators obtained from one or more Wide Area Reference Network (WARN) reference stations to infer a condition or event.

The system known from US20170971 requires special reference stations system, i.e. the WARN reference stations, comprising a set of geographically separated reference stations that receive and process satellite positioning system signals transmitted by space vehicles in a GNSS.

Jansen Kai et al. discloses a system to detect and localize GPS spoofing attacks on moving airborne targets such as UAVs or commercial airliners. Using crowdsourcing, the system continuously monitors the contents and the times of arrival of GPS-derived position advertisements that aircraft periodically broadcast for air traffic control purposes. Jansen Kai et al: "Crowd-GPS-Sec: Leveraging Crowdsourcing to Detect and Localize GPS Spoofing Attacks", 2018 IEEE SYMPOSIUM ON SECURITY AND PRIVACY (SP), IEEE, 20th may 2019, pages 1018-1031, XP033377781, DOI: 10.1109/SP.2018.00012.

Other systems from the art are known from EP2550543A1 and Y. Bardout, "Authentication of GNSS position: an assessment of spoofing detection methods", GNSS 2011—Proceedings of the 24th international technical meeting of the satellite division of the institute of navigation (Ion GNSS 2011), The institute of navigation, 8551 Rixlew Lane Suite 360 Manassas, VA. 20109, USA, 23 Sep. 2011, page 436, XP056000794.

SUMMARY OF THE INVENTION

The object of the present invention is to provide methods and technology that can be easily and cost-effectively used in detecting interfering attempts in positioning measurements.

According to the present invention, an interference detection device as defined in claim 1 is provided, which comprises:

a processing unit and memory storing instructions of a computer program configured when executed by the processing unit, to cause the processing unit to carry out the following actions:

receiving individual position data from individual ones of a plurality of mobile terminals which individual position data indicates an individual location where said individual ones of said mobile terminals are located based on positioning signals received by said mobile terminals;

identifying if at least some of said individual position data may have been affected by one or more interfering signals transmitted by at least one interfering device and interfering with said positioning signals, by means of at least one of the following actions:

(A) identifying if a number of said mobile terminals in a first area is higher than a maximum threshold number, and, if so, determining that individual position data of said number of mobile terminals may have been affected by said one or more interfering signals of said at least one interfering device;

(B) identifying if a number of said mobile terminals in a second area is lower than a minimum threshold number; and, if so, determining that individual position data of said number of mobile terminals may have been affected by said one or more interfering signals of said at least one interfering device; and (C) receiving further individual position data which further individual position data indicates further areas in which individual ones of said mobile terminals are located based on another positioning technique than a positioning technique used to determine said individual position data as received from said individual ones of said mobile terminals; said individual locations indicated by the individual position data are areas in which respective individual ones of said mobile terminals are located, and determining if, for one or more individual ones of said mobile terminals, said area overlap with said further areas at least to a minimum extent, and, if not, determining that individual position data of said one or more individual ones of said mobile terminals may have been affected by said one or more interfering signals from said at least one interfering device.

In the claimed invention, no special equipment or reference station needed. Hence, detection of positioning interfering attempts can be performed by one or more servers that need only be provided with suitable functionality, e.g., by a suitable computer program, for such detection based on position data obtained by already existing positioning techniques.

All modern smart-phones can receive GNSS constellations and LTE or other positioning data and a simple app on such smart-phones can upload position data as obtained by one or more known positioning techniques to one or more central server.

The invention also relates a system as claimed in the independent system claim, a method as claimed in the independent method claim, and a computer program product claim as claimed in the independent computer program product claim. Dependent claims claim advantageous examples of the present invention.

BRIEF DESCRIPTION OF THE DRAWINGS

Embodiments of the present disclosure will be described herein below with reference to the accompanying drawings.

However, the embodiments of the present disclosure are not limited to the specific embodiments and should be construed as including all modifications, changes, equivalent devices and methods, and/or alternative embodiments of the present disclosure.

Figure 1:
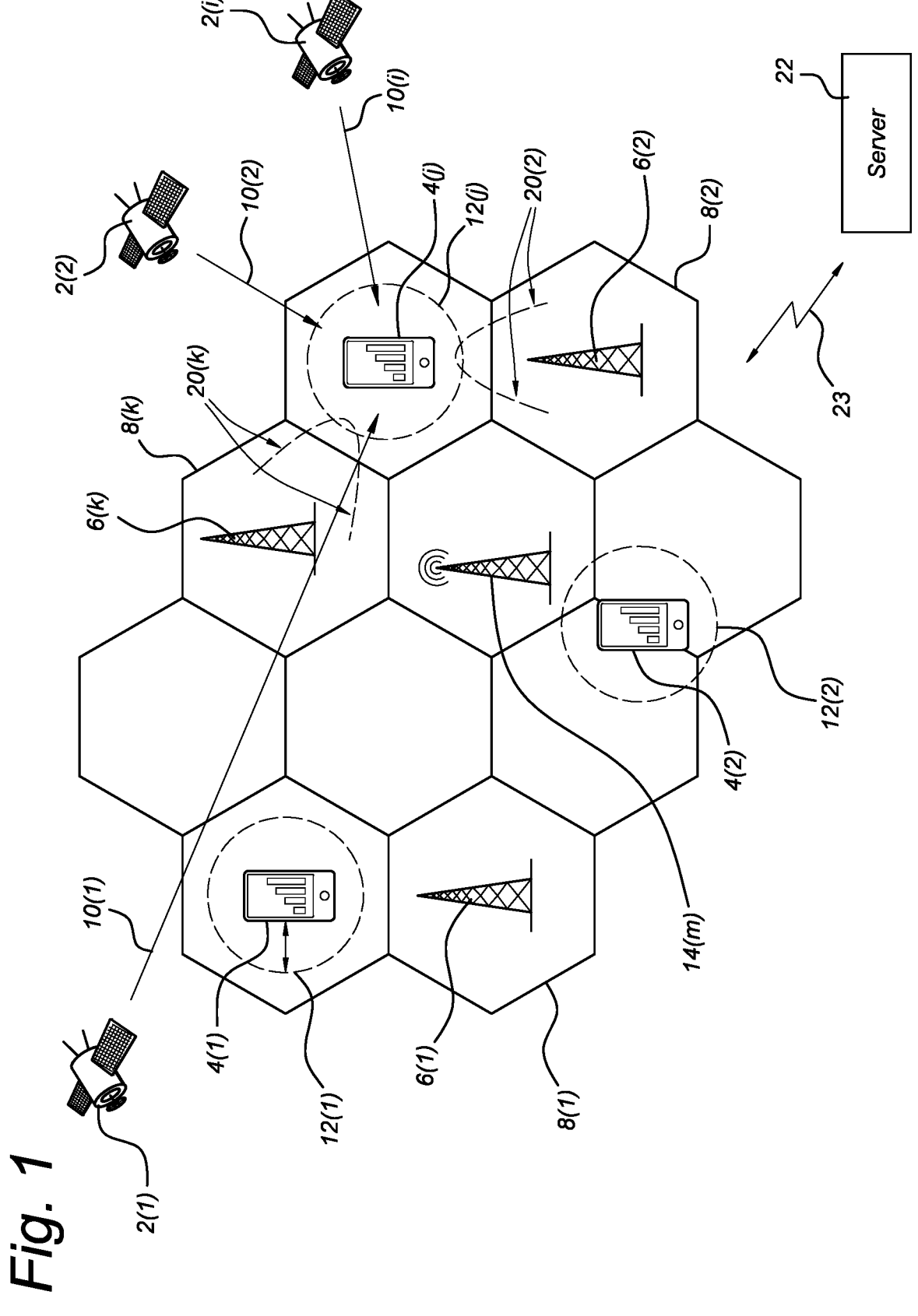

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for" "having the capacity to" "designed to" "adapted to" "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

For the purpose of determining the extent of protection conferred by the claims of this document, due account shall be taken of any element which is equivalent to an element specified in the claims.

The present invention will be discussed in more detail below, with reference to the attached drawings, in which:

FIG. 1 depicts a schematic overview of a telecommunication system in which mobile terminals determine their respective positions based on satellite positioning signals.

Figure 2A:
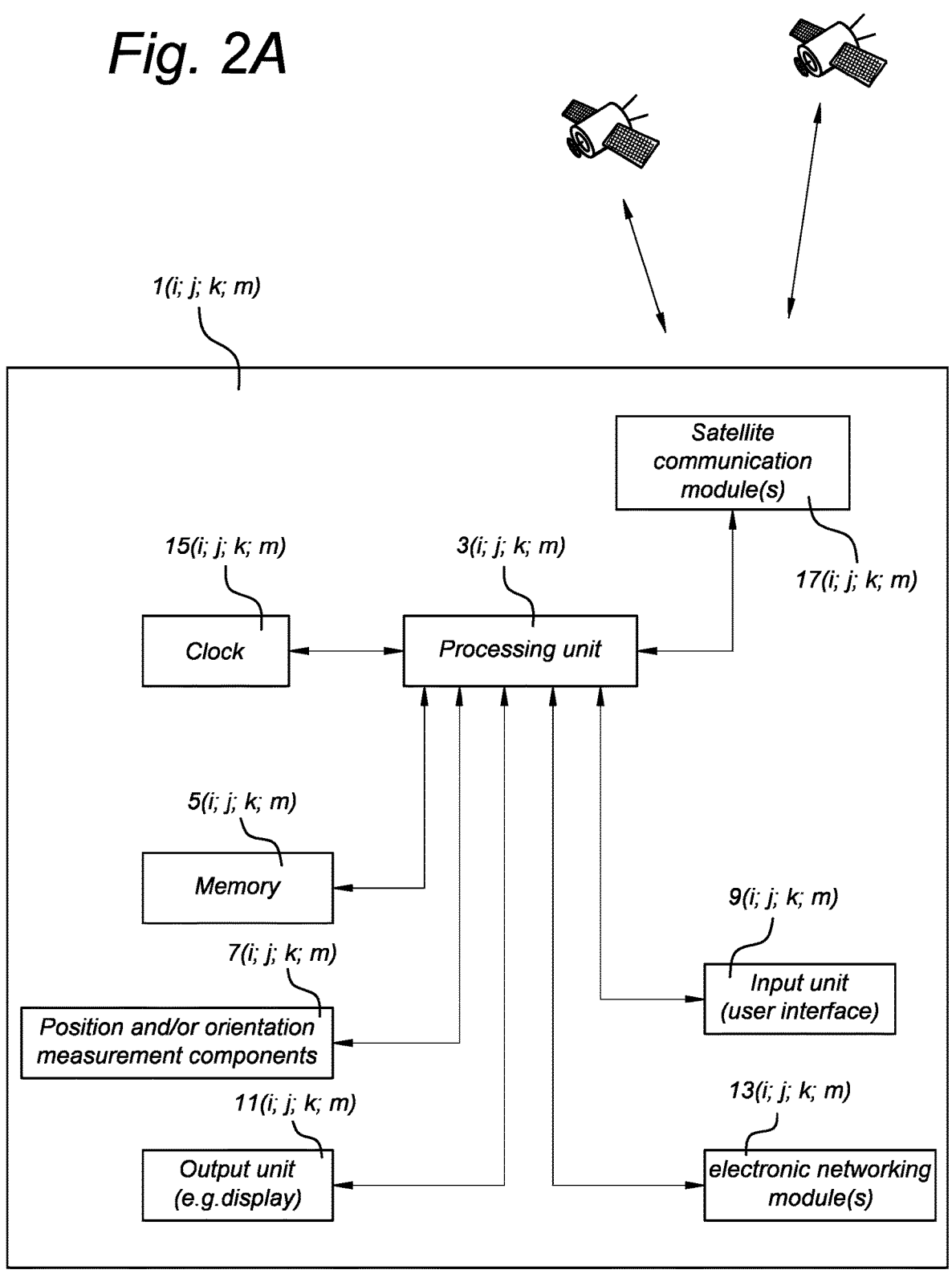

FIG. 2A shows a general block scheme of a control unit that can be used in mobile terminals, base stations, satellites and interfering devices.

Figure 2B:
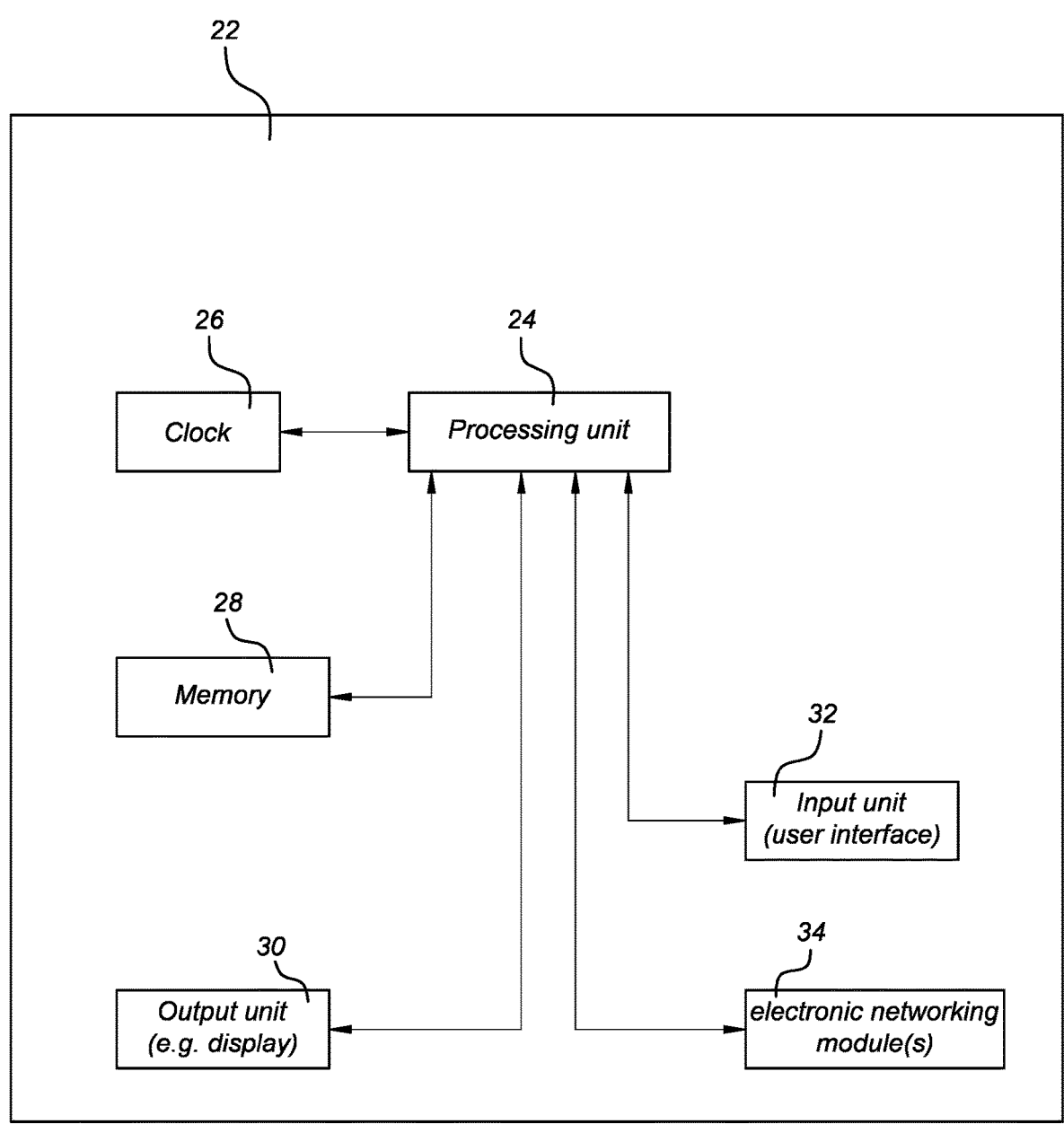

FIG. 2B shows a general block scheme of a server that can be used in the present invention.

FIGS. 3-8 are examples of network setups in which interfering attempts can be detected.

Figure 9:
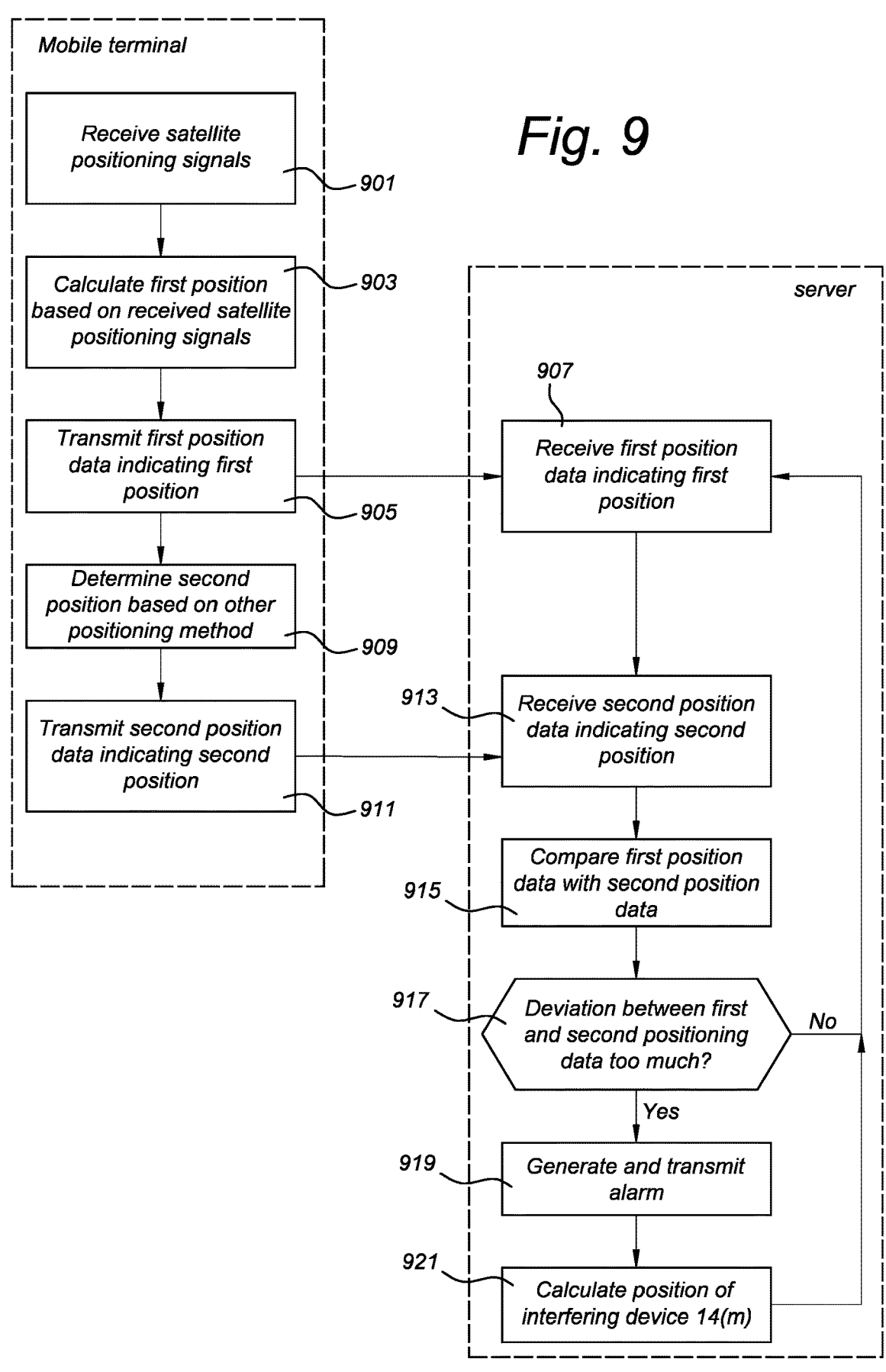
Figure 10:
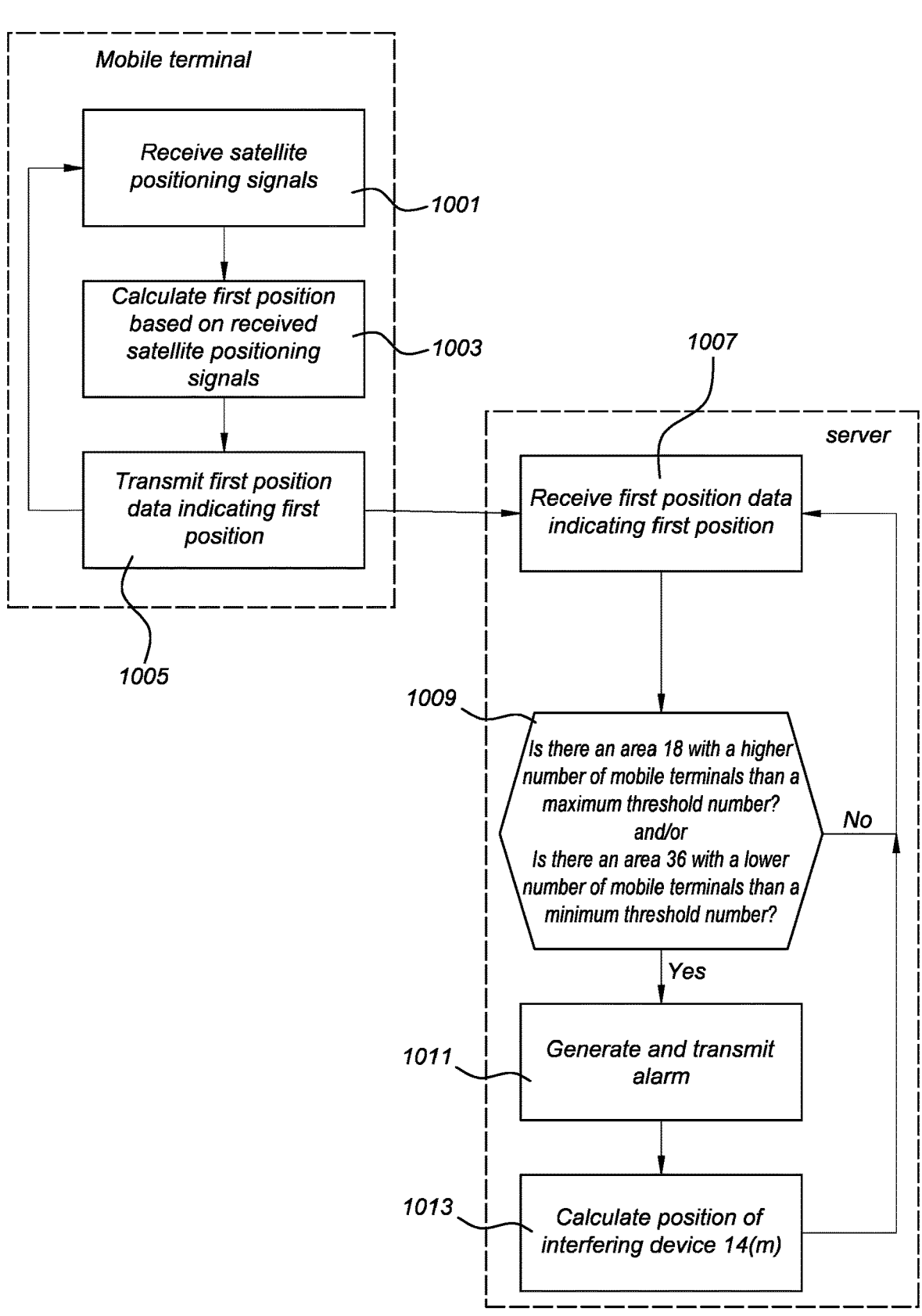

FIGS. 9 and 10 show flow charts explaining some methods for identifying positioning interfering attempts.

The invention as explained in the present document relates to several different devices that are configured to communicate with one another, as shown in FIG. 1. These devices include satellites 2(*i*) (i=1, 2, . . . , I), user terminals 4(*j*) (j=1, 2, . . . , J), base stations 6(*k*) (k=1, 2, . . . , K), interfering devices 14(*m*) (m is an integer value >=1), and a server 22. Also other communication devices may be part of such devices. Here, an "interfering device" is defined as a device that is configured to transmit electromagnetic radiation with features that are such that it can interfere with signals transmitted by other communication devices. These features may include transmitting at one or more frequencies which are not allowed to be used freely without permission of national/international telecommunication bodies, like frequencies used in 2G, 3G, 4G, 5G, etc., and frequencies used for satellite communications. These features may also include a certain power level such that interference may occur in a larger area, e.g., as large as a cell of a base station in a mobile telephone system. The signals produced by interfering devices 14(*m*) are also known as "spoofing" or "jamming".

Satellites 2(*i*) are members of a Global Navigation Satellite System, GNSS. Currently deployed/planned GNSS systems are the U.S. GPS (Global Positioning System), Russian GLONASS (Global Orbiting Navigation Satellite System), European Galileo, Chinese BeiDou/Compass (BDS or BeiDou Navigation Satellite System), Indian IRNSS (indian Regional Navigational Satellite System), and Japanese QZSS (Quazi Zenith Satellite System). In the future more such systems may be present in space and the invention is not restricted to any one of these. All satellites 2(*i*) transmit satellite positioning signals 10(*i*) that may be received by other devices and processed to calculate their own position, as is known to persons skilled in the art. Such other devices may be land-based, air-borne or floating on the sea (or other water).

Here, user terminals 4(*j*), or user equipment, UE, include any device that is operable by a user and is equipped with suitable functional units configured to calculate its own position based on positioning signals received from at least one of the above mentioned GNSS systems. User terminals 4(*j*) include mobile phones like smartphones. However, the invention is not restricted to this example. Any device that has the minimum capabilities of a user terminal as explained hereinafter and as defined by the attached claims falls within the scope of the present invention, including any device that is ground based, airborne or floating on water. Circles 12(*j*) surrounding each mobile terminal 4(*j*) indicate an area calculated by mobile terminal 4(*j*) in which mobile terminal 4(*j*) is located based on satellite positioning signals 10(*i*).

Apart from being able to calculate their own position based on positioning signals received from satellites 2(*i*), positions of user terminals 4(*j*) can be calculated based on signals transmitted in at least one other system. Nowadays, e.g. for mobile phones, such other systems include the following systems explained in the next paragraphs (cf. Wikipedia). However, some embodiments of the invention can also be applied while using (user terminal) positioning techniques/systems still to be developed. Moreover, application of these other systems is not restricted to mobile terminals.

Network-Based

The location of a mobile terminal can be determined using a service providers network infrastructure. The advantage of network-based techniques, from a service providers point of view, is that they can be implemented non-intrusively without affecting mobile terminals. Network-based techniques were developed many years prior to the widespread availability of GNNS on mobile terminals. (See e.g. U.S. Pat. No. 5,519,760, issued 21 May 1996 for one of the first works relating to this.)

Here, the technology of locating is based on measuring power levels and antenna patterns and uses the concept that a powered mobile terminal always communicates wirelessly with one or more of the closest base stations, so knowledge of the location of the base station implies the mobile terminal is nearby. This is schematically indicated in FIG. 1. I.e., FIG. 1 shows dotted lines 20(2) and 20(*k*). Dotted lines 20(2) indicate signals transmitted by base station 6(2) and dotted lines 20(*k*) indicate signals transmitted by base station 6(*k*). In this example, mobile terminal 4(*j*) receives both signals 20(2) and 20(*k*) from base stations 6(2) and 6(*k*). Using these known network-based technology a control unit of mobile terminal 4(*j*) calculates/determines its position.

Advanced systems determine the sector in which the mobile terminal is located and roughly estimate also the distance to the base station. Further approximation can be done by interpolating signals between adjacent base stations. Qualified services may achieve a near real time precision of down to 50 meters in urban areas where mobile traffic and density of base stations is sufficiently high. Rural and desolate areas may see kilo-meters between base stations and therefore determine locations less precisely.

GSM localization uses multilateration to determine the location of GSM mobile phones, or dedicated trackers, usually with the intent to locate the user.

The accuracy of network-based techniques varies, with cell identification as the least accurate (due to differential signals transposing between base stations, otherwise known as "bouncing signals") and triangulation as moderately accurate, and newer "advanced forward link trilateration" timing methods as the most accurate. The accuracy of network-based techniques is both dependent on the concentration of cell base stations, with urban environments achieving the highest possible accuracy because of the higher number of base stations, and the implementation of the most current timing methods.

Mobile Terminal-Based

The location of a mobile terminal can be determined using client software installed on the mobile terminal. This technique determines the location of the mobile terminal by putting its location by cell identification, signal strengths of the home and neighbouring cells, which is continuously sent to the carrier.

Another approach is to use a fingerprinting-based technique, where the "signature" of the home and neighbouring cells signal strengths at different points in the area of interest is recorded and matched in real-time to determine the mobile terminal location. This is usually performed independent from the carrier.

The mobile terminal based techniques require installing software on the mobile terminal, and the active cooperation of the mobile subscriber as well as software that must be able to handle the different operating systems of the mobile terminals. Typically, smartphones, such as one based on Symbian, Windows Mobile, Windows Phone, BlackBerry OS, iOS, or Android, would be able to run such software, e.g. Google Maps.

One proposed work-around is the installation of embedded hardware or software on the mobile terminal by the manufacturers, e.g., Enhanced Observed Time Difference (E-OTD).

Sim-Based

Using the subscriber identity module, SIM, in e.g. GSM and Universal Mobile Telecommunications System, UMTS, mobile terminals, it is possible to obtain raw radio measurements from the mobile terminal. Available measurements include the serving Cell ID, round-trip time, and signal strength. The type of information obtained via the SIM can differ from that which is available from the mobile terminal. For example, it may not be possible to obtain any raw measurements from the mobile terminal directly, yet still obtain measurements via the SIM.

Wi-Fi

Crowdsourced Wi-Fi data can also be used to identify a mobile terminal's location. The poor performance of the GPS-based methods in indoor environment and the increasing popularity of Wi-Fi have encouraged companies to design new and feasible methods to carry out Wi-Fi-based indoor positioning. Most smartphones nowadays combine GNSS with Wi-Fi positioning systems.

Hybrid

Hybrid positioning systems use a combination of network-based and mobile terminal-based technologies for location determination. One example would be some modes of Assisted GPS, A-GPS, which can both use GPS and network information to compute the location. Both types of data are thus used by the mobile terminal to make the location more accurate (i.e., A-GPS). Alternatively tracking with both systems can also occur by having the phone attain its GPS-location directly from the satellites, and then having the information sent via the network to the person that is trying to locate the telephone. Such systems include Google Maps, as well as, LTE's OTDOA (Observed Time Difference Of Arrival) and Enhanced Cell ID, E-CellID. E-CellID is a positioning feature introduced in rel9 E-UTRA (LTE radio) and NR (New Radio). The mobile terminal reports to the network the serving cell ID, the timing advance (difference between its transmit and receive time) and the IDs, estimated timing and power of the detected neighbour cells. The base station may report extra information to the network like the angle of arrival. The network estimates the mobile terminal position based on this information and its knowledge of the cells positions.

There are also hybrid positioning systems which combine several different location approaches to position mobile devices by Wi-Fi, WiMAX, GSM, LTE, IP addresses, and network environment data.

Position data as determined by GNSS based techniques and by such other techniques than GNSS based techniques may be transmitted to an interference detection device like server 22 in the example explained hereinafter, or by other devices in the network, like base stations.

The base stations 6(k) shown in FIG. 1 can be base stations in any telecommunication network configured to support telecommunications in accordance with one or more of the currently used telecom Standards, also known as 2G, 2.5G, 3G, 4G and 5G, as well as any future development. The bases stations 6(k) are configured to provide telecom services in one or more cells 8(k). For the purpose of the present invention base stations 6(k) also include Wi-Fi routers, and other indoor or outdoor access devices providing network access to multiple telecommunication devices like mobile terminals 4(j).

The interfering device 14(m) is able to generate and transmit spoofing and/or jamming or other positioning interfering signals.

Server 22 is shown to be configured to communicate with one or more of the other devices in FIG. 1, i.e., at least with mobile terminals 4(j), via a communication path 23 which may be wired or wireless, or any mixture thereof.

All devices shown in FIG. 1 share the fact that they have a control unit that is capable of performing many different intelligent automatic or semi-automatic operations. The heart of such operations is formed by a control unit described with reference to FIG. 2A. In FIG. 2A, functional blocks are referred to by reference signs x(i; j; k; m). Here "x(i; j; k; m)" is short for x(i), x(j), x(k), or x(m) indicating that the schematic drawing of FIG. 2A equally applies to the control units of all satellites 2(i), mobile terminals 4(j), base stations 6(k), and interfering devices 14(m).

FIG. 2A shows an example of a control unit 1(i; j; k; m). The example control unit 1(i; j; k; m) has a processing unit 3(i; j; k; m) which is connected to a clock 15(i; j; k; m), a memory 5(i; j; k; m), one or more position and/or orientation measurement components 7(i; j; k; m), an output unit 11(i; j; k; m), an input unit (or user interface) 9(i; j; k; m), electronic networking module(s) 13(i; j; k; m), and one or more satellite communication modules 17(i; j; k; m). The electronic networking modules 13(i; j; k; m) refer to units configured to provide communication via earth bound connections. Not all functional elements shown in FIG. 2A need be present as will be apparent from the following description and claims.

The processing unit 3(i; j; k; m) may be any suitable processing unit known from the art.

Memory 5(i; j; k; m) may comprise different types of sub-memories, like ROM (Read Only Memory) types of memory storing suitable program instructions and data to run the processing unit 3(i; j; k; m) such that it provides the control unit 1(i; j; k; m) with all required functionality, including the one of the present invention. Also, memory will comprise suitable RAM (Random Access Memory) types of memory for storing temporary data. Memory 5(i; j; k; m) may also comprise cache type memory. Some or all of the sub-memories may be physically located remote from the other components. Processing unit 3(i; j; k; m) is configured to send data to a remote unit via electronic networking module(s) 13(i; j; k; m), e.g., for external storage and processing. Moreover, processing unit 3(i; j; k; m) is configured to send its calculated position data to server 22 via electronic networking module(s) 13(i; j; k; m).

Position and/or orientation measurement components 7(i; j; k; m) may include one or more accelerometers and/or gyrometers/gyroscopes, as is known to a person skilled in the art. They also include a GNSS unit configured to calculate a position of the control unit $1(i; j; k; m)$ based on satellite signals received from satellites $2(i)$ via the communication modules $17(i; j; k\ m)$. Such accelerometers and/or gyrometers/gyroscopes measure the control unit's own motion and derive an updated control unit position and orientation from such measurements. The updated control unit position and/or orientation is then stored by processing unit $3(i; j; k; m)$ in memory $5(i; j; k; m)$.

Output unit $11(i; j; k; m)$ may comprises one or more sub-output-units, like a display and a speaker.

Input unit $9(i; j; k; m)$ may comprise one or more sub-input-units like a keyboard, a mouse and a microphone. The display and keyboard may be made as two distinct touch screens, however, they may also be implemented as a single touch screen.

Electronic networking modules $13(i; j; k; m)$ may comprise one or more of NR (New Radio), LTE (Long Term Evolution), Ethernet, WiFi, Bluetooth, Powerline communication, Low Power Wide Area Network (e.g. Lora™ and Sigfox™), IoT (internet of Things) and NFC (Near Field Communication) modules.

Satellite communication module(s) $17(i; j; k; m)$ are configured to transmit signals to and/or receive signals from satellites $2(i)$ in accordance with any applicable Standard related technology, i.e., in any dedicated bandwidth and with any suitable power level for that purpose. At least, satellite communication module(s) $17(j)$ in the mobile terminals $4(j)$ are configured to receive and properly process satellite positioning signals used in control unit $1(j)$ to calculate their own position.

FIG. 2B shows an example of a server 22. The example server 22 has a processing unit 24 which is connected to a clock 26, a memory 28, an output unit 30, an input unit (or user interface) 32, and electronic networking module(s) 34. The electronic networking modules 34 refer to units configured to provide communication via earth bound connections. Units to directly communicate with satellites $2(i)$ may be present too but are not shown here. Not all functional elements shown in FIG. 2B need be present as will be apparent from the following description and claims. It is also observed that though the present specification refers to one single server the server may be implemented by two or more, mutually communicating servers providing the functionality as described and claimed.

The processing unit 24 may be any suitable processing unit known from the art.

Memory 28 may comprise different types of sub-memories, like ROM (Read Only Memory) types of memory storing suitable program instructions and data to run the processing unit 24 such that it provides the server 22 with all required functionality, including the one of the present invention. Also, memory 28 will comprise suitable RAM (Random Access Memory) types of memory for storing temporary data. Memory 28 may also comprise cache type memory. Some or all of the sub-memories may be physically located remote from the other components. Processing unit 24 is configured to communicate with other communication devices like mobile terminals $4(j)$ via electronic networking module(s) 34. Here, processing unit 24 is configured to receive and process at least position data of some or all of the mobile terminals $4(j)$ as they have calculated themselves based on a certain positioning technique, like processing received satellite positioning signals.

Output unit 30 may comprises one or more sub-output-units, like a display and a speaker.

Input unit 32 may comprise one or more sub-input-units like a keyboard, a mouse and a microphone. The display and keyboard may be made as two distinct touch screens, however, they may also be implemented as a single touch screen.

Electronic networking modules 34 may comprise one or more of NR (New Radio), LTE (Long Term Evolution), Ethernet, WiFi, Bluetooth, Powerline communication, Low Power Wide Area Network (e.g. Lora™ and Sigfox™), IoT (internet of Things) and NFC (Near Field Communication) modules.

Figure 3:
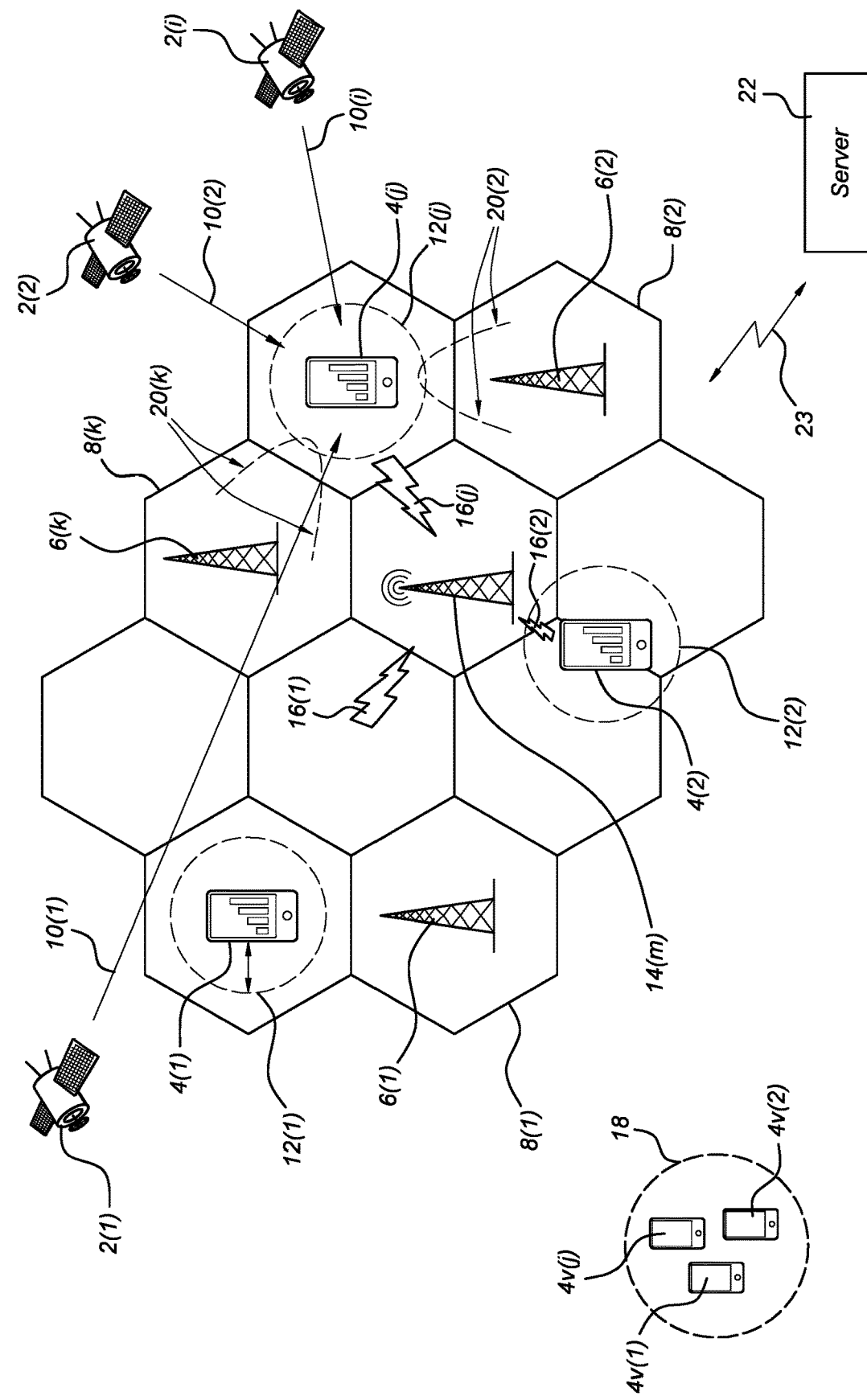

FIG. 3 copies the situation of FIG. 1 but now shows what happens after interfering device $14(m)$ starts an interfering action. The situation is explained hereinafter with reference to spoofing but is equally applicable in other situations where interfering device $14(m)$ transmits interfering signals interfering with positioning measurements.

In FIG. 3, interfering device $14(m)$ starts transmitting one or more interfering signals $16(j)$ (j=1, 2, . . . , J) which are received by mobile terminals $4(j)$. Such interfering signals $16(j)$ may be configured as carry-off attack signals as known in the prior art and discussed above. I.e., in case of satellite spoofing, such interfering device $14(m)$ then begins by broadcasting interfering signals $16(j)$ synchronized with the genuine satellite positioning signals $10(i)$ from at least one of the satellites $2(i)$ as received by the mobile terminals $4(j)$. The power of the interfering signals $16(j)$ is then gradually increased by interfering device $14(m)$ and drawn away from the genuine satellite positioning signals $10(i)$.

Consequently, at a certain moment in time, mobile terminals $4(j)$ will change their position calculations such that at least one of the satellite position signals $10(i)$ is no longer received and processed but is taken over by the one or more interfering signals $16(j)$. From that moment on, control unit $1(j)$ of the mobile terminals $4(j)$ that receive the at least one interfering signal $16(j)$ will calculate a wrong position. As indicated in FIG. 3, mobile terminals $4(1)$, $4(2)$ and $4(j)$, respectively, will calculate their respective positions as virtual positions, indicated with $4_v(1)$, $4_v(2)$ and $4_v(j)$, respectively, which may be in an area 18 displaced from the actual areas $12(1)$, $12(2)$ and $12(j)$, respectively.

In accordance with one embodiment of the invention, some or all of the mobile terminals $4(j)$ are configured such that their processing unit $3(j)$ transmits both first position data as calculated based on a first positioning calculation technique, e.g., based on the received satellite positioning signals $10(i)$ from a first GNSS system and second position data as based on at least one other, second, positioning calculation technique to server 22. These second positioning calculation techniques may be based on positioning signals received from another GNSS system which may use different frequencies and/or signal formats. However, the second positioning technique may alternatively be based on another, e.g., earth bound technique as explained above.

Server 22 is configured to compare these first position data with the second position data. The first position data will have a first inaccuracy and the second position data will have a second inaccuracy. So, the first position data indicates a first area in which the mobile terminal $4(j)$ is located and the second position data indicates a second area in which the mobile terminal $4(j)$ is located. If the comparison as performed by server 22 shows that the first area and second area do not overlap to a certain predetermined extent then server 22 will decide that there is an error in either one of the position calculations of mobile terminal $4(j)$. If this mismatch only relates to one mobile terminal $4(j)$ this need not directly indicate that interfering device $14(m)$ is active.

However, the more such mismatches are determined by server 22 in a certain area the more likely it is there is an active interfering device 14(*m*) in that area. Server 22 may be configured to generate an alarm signal indicating likelihood of an active interfering device 14(*m*) in a certain area in dependence on the number of such mismatches in that area. Moreover, server 22 may be configured to send such an alarm signal to an operator e.g. via its own output unit 30 or to an operator device, like a mobile phone, via its electronic networking module(s) 34.

In the example explained above, the first position data set is generated by for instance GPS. The second position data set can be derived from another GNSS constellation, e.g. GLONASS or Galileo (which uses a different frequency band). The second position data set can alternatively be measured by, for instance, NR/LTE localization. All mobile terminals 4(*j*) can measure their position at least with GPS and LTE. The server 22 receives the two position data sets from a plurality of individual mobile terminals 4(*j*). Should the two different position data sets be different, one of the used positioning techniques is interfered with. Comparing position data sets of more than two different independent positioning methods will improve the detection quality. As an example, in a 5G network, one could use the 4G backwards compatibility of a 5G cell (different frequency bands). Also all available GNSS constellations may be used, At the present time, this will provide five independent GNSS positioning methods. As soon as the Galileo is complete, six GNSS methods are available world-wide. In India, IRNSS can be used in addition. In Japan, QZSS can be used in addition.

In case three or more independent positioning techniques are used, server 22 may not only detect that there is a certain likelihood that there is an active interfering device 14(*m*) but also which one of the positioning techniques is most probably interfered with, i.e., the closer the position data sets are located to one another the more likely it is their positioning techniques are not interfered with. At the same time, the positioning technique rendering position data most remotely located from the position data sets from the other positioning techniques is most probably interfered with.

In one embodiment, when server 22 has determined that interfering device 14(*m*) may be active, server 22 may send a control signal to mobile terminals 4_v_(*j*) having transmitted the first position signal and second position signal indicating non-overlapping position areas. Such a control signal may cause these mobile terminals 4_v_(*j*) to measure the signal strength of interfering signals 16(*j*) as measured by their satellite positioning signal receiver(s) and to send such signal strengths to server 22. Server 22 may be configured to use the signal strengths of several mobile terminals 4_v_(*j*) in a calculation to determine the location of the interfering device 14(*m*). This can be done by extrapolation of field strength lines or circles of similar field strength magnitude as measured by these mobile terminals and as forwarded to server 22.

Server 22 may, e.g., assume that the interfering signals 16(*i*) are fed into an omnidirectional aerial, in which case the gradient towards the strongest measured field strengths can be used by server 22 to extrapolate the location of the interfering device 14(*m*). Extrapolation may be done in relation to the most probable location of mobile terminals 4(*j*), which may be determined by server 22 when position data sets from three or more independent positioning techniques are used, as explained above. The transmitter itself may be located at another location than the aerial, i.e., the transmitter may be connected to an aerial by a transmission line such that the transmitter is located remotely. Then, only the aerial's location may be determined. However, determining the location of interfering device 14(*m*) may alternatively or additionally be based on assuming a different radiation pattern of interfering device 14(*m*). The interfering device 14(*m*) may, for instance, employ a directional aerial in order to transmit interfering signals 16(*j*) in a certain directional pattern to a certain region. Server 22 may be configured to use machine learning algorithms (artificial intelligence) to determine the location of the interfering aerial and device by determining an interfering radiation pattern.

Once a location of an aerial and/or transmitter is determined, the proposed system can alert the authorities about the activity of a spoofing or jamming transmitter.

Other embodiments of the present invention can be used for identifying potential spoofing in areas where presence of a large number of mobile terminals may be expected. Such expectations may be restricted to certain locations in certain moments in time, like shops or shopping streets in a city or town which will be very crowded at the end of the working day or in the weekends. Another example may be offices or areas where events are held such as in stadiums and event halls.

Figure 4:
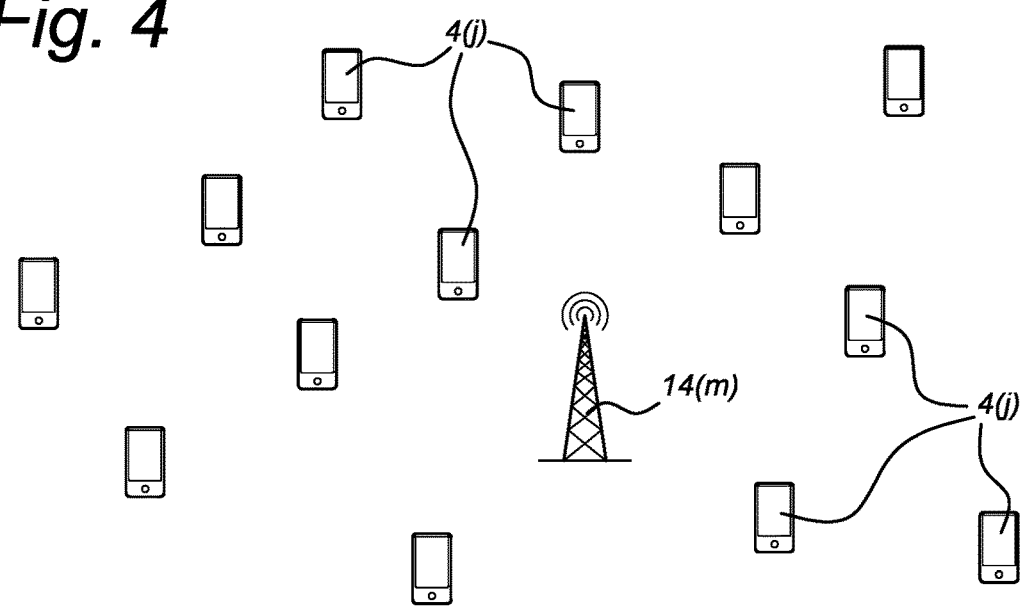

FIG. 4 shows many mobile terminals 4(*j*) in such an area in which also interfering device 14(*m*) is located.

Figure 5:
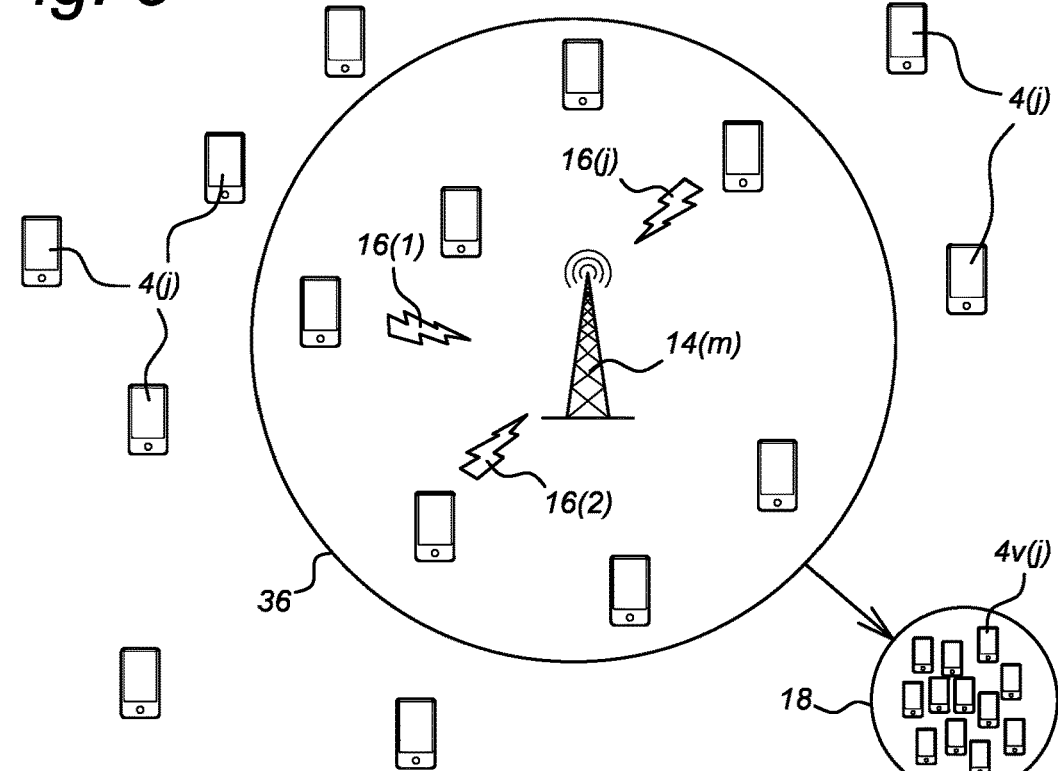

FIG. 5 shows how interfering device 14(*m*) starts its interfering activity by transmitting interference signals 16(1), 16(2), 16(*j*). Circle 36 indicates an interference area in which interfering signals 16(1), 16(2), 16(*j*) may be effective. So, if these interfering signals spoof the satellite signals 10(*i*) mobile terminals 4(*j*) in area 36 miscalculate their positions as based on the satellite signals 10(*i*) and the interfering signals. Their calculated positons, indicated with 4_v_(*j*), may be in a rather small area 18 outside area 36.

Once again, the miscalculated positions 4_v_(*j*) in area 18 are sent to server 22. In this embodiment, server 22 is configured to calculate the number of mobile terminals having transmitted their position 4_v_(*j*) to be located in area 18 and compare this number to a certain maximum threshold number indicating a maximum expected number of mobile terminals per surface unit. If the number of mobile terminals 4_v_(*j*) exceeds this maximum threshold number, the server 22 will generate the alarm signal to be conveyed to the operator and indicating a potential spoofing threat.

Such a maximum threshold number may be a predetermined maximum threshold number stored in memory 28 of server 22. The maximum threshold number may also be a number fluctuating over time, e.g., depending on an expected average presence of mobile terminals as a function of time and location of area 18. Such an expected average presence may be stored in memory 28 by an operator. Alternatively, such an average presence may be based on position data received from mobile terminals 4(*j*) in, e.g., a larger predetermined area, like an entire shopping street, an entire shop, a stadium, etc. as calculated by these mobile terminals based on other positioning techniques than satellite positioning signals 10(*i*) as explained above. Such another positioning technique may include network-based techniques, like NR and/or LTE positioning.

Like in the example explained with reference to FIG. 3, in case three or more independent positioning techniques are used, server 22 may not only detect that there is a certain likelihood that there is an active interfering device 14(*m*) but also which one of the positioning techniques is most probably interfered with, i.e., the closer the position data sets are located to one another the more likely it is their positioning techniques are not interfered with. At the same time, the positioning technique rendering position data most remotely located from the position data sets from the other positioning techniques is most probably interfered with.

In one embodiment, when server 22 has determined that interfering device 14(*m*) may be active, server 22 may send a control signal to mobile terminals 4$_v$(j) having transmitted the first position signal and second position signal indicating non-overlapping position areas. Such a control signal may cause these mobile terminals 4$_v$(j) to measure the signal strength of interfering signals 16(*j*) as measured by their satellite positioning signal receiver(s) and to send such signal strengths to server 22. Server 22 may be configured to use the signal strengths of several mobile terminals 4$_v$(j) in a calculation to determine the location of the interfering device 14(*m*). This can be done by extrapolation of field strength lines or circles of similar field strength magnitude as measured by these mobile terminals and as forwarded to server 22.

Server 22 may, e.g., assume that the interfering signals 16(*i*) are fed into an omnidirectional aerial, in which case the gradient towards the strongest measured field strengths can be used by server 22 to extrapolate the location of the interfering device 14(*m*). Extrapolation may be done in relation to the most probable location of mobile terminals 4(*j*), which may be determined by server 22 when position data sets from three or more independent positioning techniques are used, as explained above. The transmitter itself may be located at another location than the aerial, i.e., the transmitter may be connected to an aerial by a transmission line such that the transmitter is located remotely. Then, only the aerial's location may be determined. However, determining the location of interfering device 14(*m*) may alternatively or additionally be based on assuming a different radiation pattern of interfering device 14(*m*). The interfering device 14(*m*) may, for instance, employ a directional aerial in order to transmit interfering signals 16(*j*) in a certain directional pattern to a certain region. Server 22 may be configured to use machine learning algorithms (artificial intelligence) to determine the location of the interfering aerial and device by determining an interfering radiation pattern.

Figure 6:
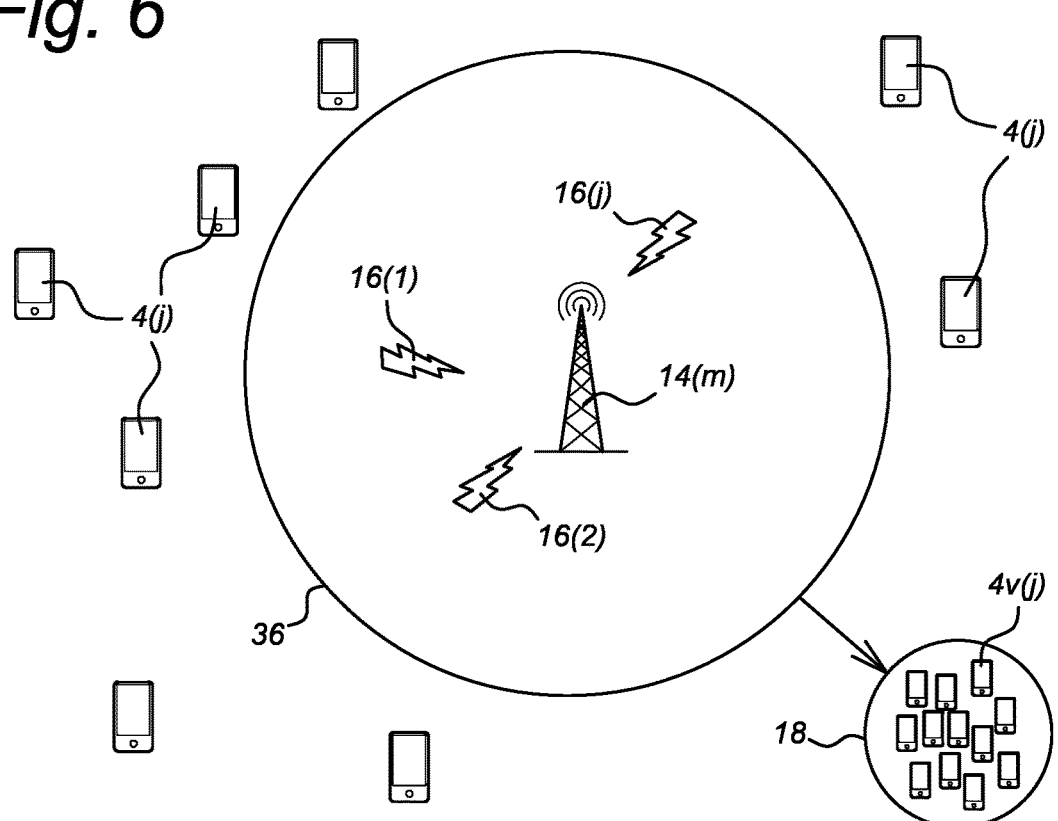

In the case that no other positioning techniques are used or available, another indicator for spoofing/interference may be used. I.e., server 22 may not only identify a potential interference threat based on the number of miscalculated mobile terminals 4$_v$(j) in area 18 but also on identifying area 36 as an area in which an unexpectedly low number of mobile terminals 4(*j*) is present, as schematically shown in FIG. 6. In other words, server 22 may be configured to identify that the number of mobile terminals 4(*j*) in a certain area 36 is below an expected lower threshold number, e.g. calculated by multiplying a minimum expected number of mobile terminals per surface unit by the surface size of area 36.

Such a minimum threshold number may be a predetermined minimum threshold number stored in memory 28 of server 22. The minimum threshold number may also be a number fluctuating over time, e.g., depending on an expected average presence of mobile terminals as a function of time and location of area 18. The minimum threshold number may, for instance, depend on time of day, e.g., day or night, working day or holiday, weekends, or averages thereof. Such an expected average presence may be stored in memory 28 by an operator.

That minimum threshold may be uses as an indicator of an active interfering device 14(*m*). If the number of mobile terminals 4(*j*) in area 36 is lower than this minimum threshold number, server 22 will generate the alarm signal to be conveyed to the operator and indicating a potential spoofing, or other interfering threat. Server 22 may be configured to calculate a centre of the area 36 and identify this centre as the most likely location of a potential interfering device 14(*m*).

Figure 7:
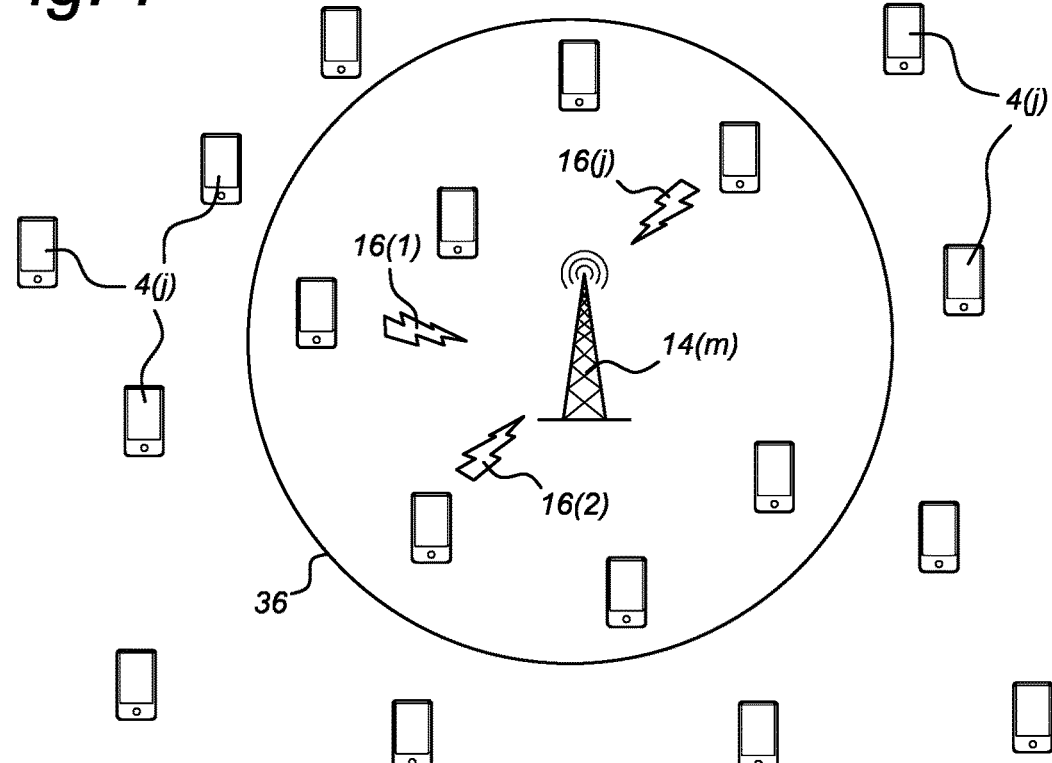

FIG. 7 shows a situation similar to the one described with reference to FIG. 5. The difference is that server 22 is unable to identify area 18 with an unexpected high number of mobile terminals. That may be because of several different causes, e.g., the miscalculations done by those mobile terminals 4(*j*) receiving interfering signals 16(1), 16(2) and/or 16(*j*) may cause them to transmit virtual locations to server 22 not resulting in such a densely populated area 18. In such a situation, server 22 may be configured to identify a potential active interference device 14(*m*) based solely on determining that the number of mobile terminals 4(*j*) in area 36 is below the earlier mentioned minimum threshold number.

Again, server 22 may be configured to, then, generate the alarm signal to be conveyed to the operator and indicating a potential spoofing, or other interfering threat. However, again, another positioning technique may be used to have mobile terminals 4(*j*) calculate their positions which are then transmitted to server 22. Server 22 may be configured to use these positions to calculate or estimate such a minimum threshold number. Again, server 22 may be configured to calculate a centre of the area 36 and identify this centre as the most likely location of a potential interfering device 14(*m*).

Figure 8:
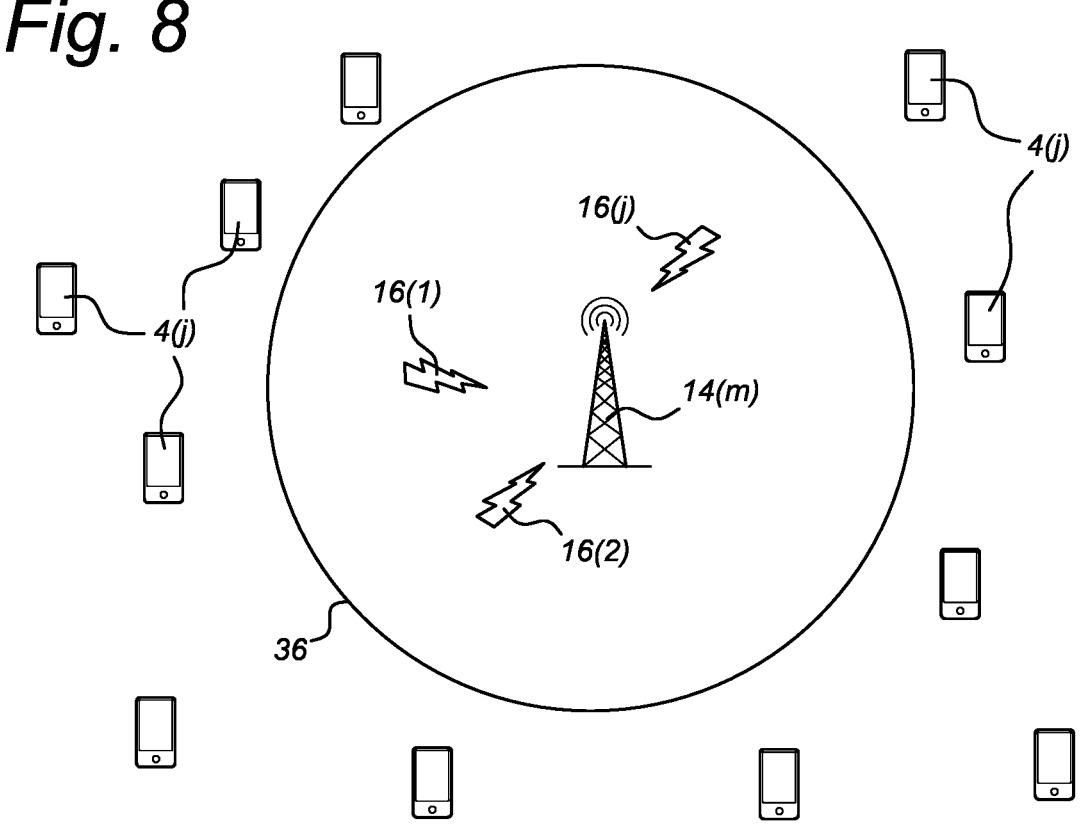

FIG. 8 shows a situation where no other such positioning technique is available or used. Then, server 22 only receives the positioning data from mobile terminals 4(*j*) based on one source, i.e., in the explained example the satellite positioning signals 10(*i*). Then, server 22 is configured to identify a potential active interference device 14(*m*) based solely on determining that the number of mobile terminals 4(*j*) in area 36 is below the earlier mentioned minimum threshold number.

FIG. 9 shows a flow chart of a method that can be used to identify interfering attempts. The method is associated with the setup of FIG. 3 as explained above.

FIG. 9 shows some actions as performed by mobile terminals 4(*j*) and actions as performed by server 22. It is assumed many mobile terminals 4(*j*) are present that are configured to perform such actions.

In action 901, the mobile terminals 4(*j*) receive satellite positioning signals from several satellites 2(*i*) and/or from one or more interfering devices 14(*m*). In action 903, mobile terminals 4(*j*) calculate a first position of themselves based on the received satellite positioning signals. In action 905 they send first position data indicating their first positions to server 22.

In action 907, server 22 receives the first position data from the plurality of mobile terminals 4(*j*).

In action 909, mobile terminals 4(*j*) determine a second position of themselves based on another positioning technique than the one based on calculations performed using satellite positioning signals. In action 911, mobile terminals 4(*j*) transmit second position data indicating these second positions to server 22.

It is to be understood that FIG. 9 shows blocks 901-905 as performed earlier in time than blocks 909-911. However, the order may be the other way around. Preferably, they are performed continuously in parallel to each other by mobile terminals 4(*j*).

In action 913, server 22 receives the second position data indicating the second positions from mobile terminals 4(*j*). Action 913 is shown to be later in time than action 907. However, actions 907 and 913 will occur synchronized in time with the respective transmission actions 905 and 911 by mobile terminals 4(*j*).

In action 915, server 22 compares the first position data of the individual mobile terminals 4(*j*) with the second position data of these individual mobile terminals 4(*j*). If the difference between these individual first and second positions of a plurality of mobile terminals exceeds a certain threshold value, as server 22 checks in action 917, then, server 22 decides this may be caused by one or more mobile terminals 4(*j*) receiving interfering satellite positioning signals from one or more interfering devices 14(*m*) instead of from satellites 2(*i*), and server 22 will jump to action 919. If not, server 22 will return to action 907. Determining that the difference between the first and second positions is too large may include taking into account inaccuracies in the first positions and second positions, respectively. Each first position, for example, indicates a first area in which a respective mobile terminal 4(*j*) is located and each second position indicates a second area in which the same respective mobile terminal 4(*j*) is located. If these first and second areas for individual ones of a plurality of mobile terminals do not overlap, then, server 22 determines there may be an interfering attempt. This decision may also depend on the amount of mobile terminals 4(*j*) of which the respective first and second positions deviate too much and/or a size of an area in which respective second positions of a plurality of mobile terminals deviate too much from respective first positions of this plurality of mobile terminals 4(*j*).

In action 919, server 22 may generate an alarm signal for an operator and transmit such an alarm signal to the operator by any suitable means (e.g. on a monitor of server 22, or to a mobile device via a telecommunication network). The alarm signal indicates such potential interfering attempt by one or more interfering devices 14(*m*). In action 921, server 22 may calculate a possible position of interfering device 14(*m*) in a way as described earlier with reference to FIG. 3. Of course, actions 919 and 921 may be turned around in time or performed concurrently.

FIG. 10 shows a flow chart of an alternative method that can be used to identify interfering attempts. The method is associated with the setup of FIGS. 4-8 as explained above.

FIG. 10 shows some actions as performed by mobile terminals 4(*j*) and actions as performed by server 22. It is assumed many mobile terminals 4(*j*) are present that are configured to perform such actions.

In action 1001, the mobile terminals 4(*j*) receive satellite positioning signals from several satellites 2(*i*) and/or from one or more interfering devices 14(*m*). In action 1003, mobile terminals 4(*j*) calculate a first position of themselves based on the received satellite positioning signals. In action 1005 they send first position data indicating their first positions to server 22.

In action 1007, server 22 receives the first position data from the plurality of mobile terminals 4(*j*).

In action 1009, based on the received first position data, server 22 determines if there is an area 18 with a higher number of mobile terminals 4ᵥ(*j*) than expected, i.e., higher than a maximum threshold number. Preferably, this area 18 should have a minimum size in order to disregard normal statistical errors in these first position data.

In action 1009, server 22 may alternatively or additionally check if there is an area 36 with a lower number of mobile terminals 4(*j*) than a minimum threshold number. Preferably, this area 36 should have a minimum size in order to disregard normal statistical errors in these first position data.

If in either one of these checks in action 1009, the determination is positive server 22 jumps to action 1011. If not, server 22 returns to action 1007.

In action 1011, server 22 may generate an alarm signal for an operator and transmit such an alarm signal to the operator by any suitable means (e.g. on a monitor of server 22, or to a mobile device via a telecommunication network). The alarm signal indicates such potential interfering attempt by one or more interfering devices 14(*m*). In action 1013, server 22 may calculate a possible position of interfering device 14(*m*) in a way as described earlier with reference to any of the FIGS. 4-8. Of course, actions 1011 and 1013 may be turned around in time or performed concurrently.

Variations to the disclosed embodiments can be understood and effected by a person skilled in the art in practicing the claimed invention, from a study of the figures, the description and the attached claims. In the description and claims, the word "comprising" does not exclude other elements, and the indefinite article "a" or "an" does not exclude a plurality. In fact it is to be construed as meaning "at least one". The mere fact that certain features are recited in mutually different dependent claims does not indicate that a combination of these features cannot be used to advantage. Any reference signs in the claims should not be construed as limiting the scope of the invention. Features of the above described embodiments and aspects can be combined unless their combining results in evident technical conflicts.

The invention claimed is:

1. A system comprising:

a plurality of mobile terminals, each mobile terminal including a satellite positioning signal receiver and a network receiver, each satellite positioning signal receiver configured to receive positioning signals are from one or more satellites and each network receiver configured to receive further position signals;

an interference detection device including:

a processing unit and memory storing instructions of a computer program configured when executed by the processing unit, to cause the processing unit to:

receive individual position data from at least one mobile terminal of the plurality of mobile terminals, wherein the individual position data indicates an individual location where the at least one mobile terminal of the plurality of mobile terminals is located;

receive further individual position data from the at least one mobile terminal of the plurality of mobile terminals, the further individual position data based on a network positioning technique different than a positioning technique used to determine the individual position data;

determine whether a number of the plurality of mobile terminals in an area is greater or less than a first threshold, wherein the first threshold is an expected number of mobile phones in the area;

in response to the number of the plurality of mobile terminals in the area being greater or less than the first threshold, determine that at least some of the individual position data of the number of mobile terminals was affected by one or more interfering signals transmitted by at least one interfering device and interfering with the positioning signals, when:

a deviation between the individual position data and the further individual position data exceed a second threshold, wherein the further individual position data indicates further areas in which the at least one mobile terminal of the plurality of mobile terminals is located; and in response to the determining, calculate a location of the interfering device based at least in part on signal strength of the one or more interfering signals.

2. The system according to claim 1, wherein the positioning signals are satellite positioning signals as transmitted by satellites in a Global Navigation Satellite System, GNSS, including at least one of Global Positioning System, Global Orbiting Navigation Satellite System, Galileo, BeiDou/Compass, Indian Regional Navigational Satellite System, and Quazi Zenith Satellite System.

3. The system according to claim 1, wherein the number of the mobile terminals in the area is greater than the first threshold, wherein the first threshold number is a maximum threshold number and is a first expected number of mobile phones in the area, which first expected number may be a predetermined maximum threshold number or a first number fluctuating over time.

4. The system according to claim 3, wherein the first number fluctuating over time depends on at least one of a first expected average presence of mobile terminals as a function of time, location of the first area, and size of the first area.

5. The system according to claim 4, wherein the first expected average presence is based on the further individual position data and the further individual position data indicates further areas in which each one of the mobile terminals is located.

6. The system according to claim 1, wherein, the interference detection device is configured to calculate a location of the at least one interfering device by:

sending a control signal to mobile terminals having transmitted individual position data to cause the mobile terminals to measure a signal strength of interfering signals;

receiving the signal strengths from the mobile terminals; and using these signal strengths in a calculation to determine the location of the interfering device.

7. The system according to claim 1, wherein the number of the mobile terminals in the area is lower than the first threshold, wherein the first threshold is a minimum threshold number and is a second expected number of mobile phones in a second area, which second expected number may be a predetermined minimum threshold number or a second number fluctuating over time.

8. The system according to claim 7, wherein the second number fluctuating over time depends on at least one of a second expected average presence of mobile terminals as a function of time, location of the second area, and size of the second area.

9. The system according to claim 8, wherein a second expected average presence is based on the further position data which further position data indicates further areas in which each one of the mobile terminals is located.

10. The system according to claim 1, wherein, the interference detection device is configured to determining a location of the at least one interfering device by calculating a center of a second area and identifying this center as a most likely location of the interfering device.

11. The system according to claim 1, wherein, the interference detection device is configured to calculate a location of the at least one interfering device by:

receiving signal strengths of interfering signals from the mobile terminals which have transmitted position signals indicating a location in a further area;

using these signal strengths in a calculation to determine the location of the interfering device.

12. The system according to claim 11, wherein the interference detection device is configured to perform the calculation to determine the location of the interfering device based on the further individual position data.

13. The system according to claim 1, wherein the different network positioning technique is one of a network-based positioning technique, a mobile terminal-based positioning technique, a SIM-based positioning technique, a WiFi-based positioning technique, and a hybrid-based positioning technique.

14. The system according to claim 1, wherein the mobile terminals are configured to send further individual position data to the interference detection device based on another positioning technique than used to calculate the individual position.

15. The system according to claim 1, wherein the individual locations indicated by the individual position data are areas in which respective individual ones of the mobile terminals are located, and determining if, for one or more individual ones of the mobile terminals, the areas overlap with the further areas at least to a minimum extent, and, if not, determining that individual position data of the one or more individual ones of the mobile terminals may have been affected by the one or more interfering signals from the at least one interfering device.

16. A method of identifying if an interference device is active in a positioning system determining positions of a plurality of mobile terminals, the method comprising:

receiving, at an interference detection device from at least one mobile terminal, individual position data of the at least one mobile terminal of the plurality of mobile terminals, wherein the individual position data indicates an individual location of the at least one mobile terminal of the plurality of mobile terminals based on positioning signals from one or more satellites received by a satellite positioning signal receiver of the mobile terminals;

receiving further individual position data from the at least one mobile terminal of the plurality of mobile terminals, the further individual position data based on a network positioning technique different than a positioning technique used to determine the individual position data, wherein the further individual position data is received by a network receiver of the least one mobile terminal;

determining whether that a number of the plurality of mobile terminals in an area is greater or less than a first threshold, wherein the first threshold is an expected number of mobile phones in the area;

in response to determining that the number of the plurality of mobile terminals in the area being is greater or less than the first threshold, determining that a deviation between the individual position data and the further individual position data of the at least one mobile terminal exceeds a second threshold, wherein the further individual position data indicates further areas in which the at least one mobile terminal of the plurality of mobile terminals is located;

in response to determining that the deviation exceeds the second threshold, determining that at least some of the individual position data of the number of mobile terminals was affected by one or more interfering signals transmitted by at least one interfering device and interfering with the positioning signals; and when:

a deviation between the individual position data and the further individual position data exceed a second threshold, wherein the further individual position data indicates further areas in which the at least one mobile terminal of the plurality of mobile terminals is located; and in response to the determining that at least some of the individual position data was affected by one or more interfering signals, calculating a location of the at least one interfering device based at least in part on signal strength of the one or more interfering signals.

17. A method of identifying if an interference device is active in a positioning system determining positions of a plurality of mobile terminals, the method comprising:

receiving, by at least one mobile terminal via a respective satellite positioning signal receiver, positioning signals from one or more satellites;

calculating, by the at least one mobile terminal of the plurality of mobile terminals, individual position data indicating a location where the at least one mobile terminal of the mobile terminals based on the positioning signals received by the mobile terminals;

receiving, by an interference detection device, the individual position data from the at least one mobile terminal of the plurality of mobile terminals;

receiving further individual position data from the at least one mobile terminal of the plurality of mobile terminals, the further individual position data based on a network positioning technique different than a positioning technique used to determine the individual position data, wherein the further individual position data is received by a network receiver of the least one mobile terminal;

determining whether that a number of the plurality of mobile terminals in an area is greater or less than a first threshold, wherein the first threshold is an expected number of mobile phones terminals in the area;

in response to determining that the number of the plurality of mobile terminals in the area being is greater or less than the first threshold, determining that, by the interference detection device, a deviation between the individual position data and the further individual position data of the at least one mobile terminal exceeds a second threshold, wherein the further individual position data indicates further areas in which the at least one mobile terminal of the plurality of mobile terminals is located;

in response to determining that the deviation exceeds the second threshold, determining that at least some of the individual position data of the number of mobile terminals was affected by one or more interfering signals transmitted by at least one interfering device and interfering with the positioning signals; and when:

a deviation between the individual position data and the further individual position data exceed a second threshold, wherein the further individual position data indicates further areas in which the at least one mobile terminal of the plurality of mobile terminals is located; and in response to the determining that at least some of the individual position data was affected by one or more interfering signals, calculating a location of the at least one interfering device based at least in part on signal strength of the one or more interfering signals.

18. A non-transitory computer-readable medium storing instructions which, when executed by one or more processors, cause the one or more processor to:

calculate, by individual ones of a plurality of mobile terminals, individual position data indicating a location where each individual one of the mobile terminals is located based on positioning signals received by the mobile terminals, wherein each of the mobile terminals including a satellite positioning signal receiver, wherein the positioning signals are from one or more satellites;

receive, by an interference detection device, the individual position data from the individual ones of the plurality of mobile terminals;

receive further individual position data from individual ones of the plurality of mobile terminals, the further individual position data based on a different positioning technique than a positioning technique used to determine the individual position data;

determine whether a number of the plurality of mobile terminals in an area is greater or less than a first threshold, wherein the first threshold is an expected number of mobile phones in the area;

in response to the number of the plurality of mobile terminals in the area being greater or less than first threshold, determine that, by the interference detection device, at least some of the individual position data of the number of mobile terminals was affected by one or more interfering signals transmitted by at least one interfering device and interfering with the positioning signals, when:

a deviation between the individual position data and the further individual position data exceed a second threshold, wherein the further individual position data indicates further areas in which individual ones of the mobile terminals are located; and in response to the determining, calculate a location of the interfering device based at least in part on signal strength of the plurality of mobile terminals.

19. A non-transitory computer-readable medium storing instructions which, when executed by one or more processors, cause the one or more processors to:

receive individual position data from at least one mobile terminal of a plurality of mobile terminals which individual position data indicates an individual location where the at least one mobile terminal of the plurality of mobile terminals based on positioning signals received by a satellite positioning signal receiver of the mobile terminals from one or more satellites;

receiving further individual position data from the at least one mobile terminal of the plurality of mobile terminals, the further individual position data based on a network positioning technique different than a positioning technique used to determine the individual position data, wherein the further individual position data is received by a network receiver of the least one mobile terminal;

determine whether a number of the plurality of mobile terminals in an area is greater or less than a first threshold, wherein the first threshold is an expected number of mobile phones in the area;

in response to the number of the plurality of mobile terminals in the area being greater or less than the first threshold, determine that at least some of the individual position data of the number of mobile terminals was affected by one or more interfering signals transmitted by at least one interfering device and interfering with the positioning signals, when:

a deviation between the individual position data and further individual position data exceed a second threshold, wherein the further individual position data indicates further areas in which the at least one mobile terminal of the plurality of mobile terminals are located; and in response to the determining, calculating a location of the interfering device based at least in part on signal strength of the plurality of mobile terminals.

* * * * *